(12) United States Patent
Beyabani

(10) Patent No.: US 8,898,686 B2
(45) Date of Patent: Nov. 25, 2014

(54) VIDEO ON DEMAND SNEAK PEEK AND "SNIPPET" BILLING

(75) Inventor: Syed Zafar Beyabani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1527 days.

(21) Appl. No.: 11/862,277

(22) Filed: Sep. 27, 2007

(65) Prior Publication Data

US 2009/0089844 A1 Apr. 2, 2009

(51) Int. Cl.
*H04N 7/16* (2011.01)
*H04N 7/173* (2011.01)
*H04N 21/24* (2011.01)
*H04N 21/482* (2011.01)
*H04N 21/472* (2011.01)
*H04N 21/2543* (2011.01)
*H04N 21/845* (2011.01)

(52) U.S. Cl.
CPC ....... *H04N 7/17318* (2013.01); *H04N 21/2407* (2013.01); *H04N 21/482* (2013.01); *H04N 21/47202* (2013.01); *H04N 21/2543* (2013.01); *H04N 21/8456* (2013.01)
USPC .............................................. 725/8; 725/104

(58) Field of Classification Search
USPC ................................................ 725/87, 104, 8
See application file for complete search history.

(56) References Cited

U.S. PATENT DOCUMENTS

| | | | |
|---|---|---|---|
| 7,809,680 B2 * | 10/2010 | Fujioka | 707/609 |
| 2002/0178446 A1 * | 11/2002 | Sie et al. | 725/32 |
| 2003/0196204 A1 * | 10/2003 | Thiagarajan et al. | 725/61 |
| 2004/0078484 A1 * | 4/2004 | Parry et al. | 709/242 |
| 2004/0255320 A1 * | 12/2004 | Terao | 725/8 |
| 2006/0015925 A1 * | 1/2006 | Logan | 725/135 |
| 2009/0034784 A1 * | 2/2009 | McQuaide, Jr. | 382/100 |

* cited by examiner

*Primary Examiner* — Nasser Goodarzi
*Assistant Examiner* — Michael Hong

(57) ABSTRACT

A system and method for soliciting a selection of video content from a user after presenting the user with an interface showing the user the video content currently available for viewing. The system provides the user an option of both viewing the content in its entirety and partially viewing the content. With the partial viewing options the user may select and view a scene or scenes, or may navigate through the content to find the portion or "snippet" of the content they wish to view. The system tracks the length of viewing and the client is charged in accordance with the amount of content viewed.

18 Claims, 11 Drawing Sheets

700

Welcome to Video on Demand

Browse available title

| Browse A-Z |
| Action |
|   | movie title A |
|   | movie title B |
| Adventure |
| Comedy |
| Drama |
| Family |
| Thriller |

Search for titles

[                              ]

Search for

[          ] V

| Title |
| Actor |
| Producer, |
| Etc. |

You have selected the following title for viewing.

What is your viewing preference?

VIDEO ON DEMAND SNEAK PEEK AND "SNIPPET" BILLING

BACKGROUND INFORMATION

Conventionally, video-on-demand (VOD) purchases are an all or nothing approach. The viewer has a choice of purchasing and viewing an entire movie, or not purchasing the movie at all. With conventional systems, the user is not provided flexible viewing options. For example, the user is not able to do such things as take a sneak peek of a new movie or view a portion of a favorite movie. Also, conventional systems may limit the options of a user who may enjoy a particular scene or scenes from a certain movie, but does not like the movie in its entirety. With conventional systems, the user is limited to an all-or-nothing approach and is not given the option of purchasing video content in less than its entirety.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 7 is a screenshot of an on-demand graphical user interface (GUI), in accordance with exemplary embodiments;

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments may include providing a predetermined collection of viewable video content to a user, receiving a video content selection from the user, providing the user with the option of viewing a portion of the video content, acquiring data representing the duration of the portion of the video content viewed by the user, and using said acquired data to determine a monetary charge for the viewing.

The description below describes servers, set top boxes (STBs), display devices, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, set top boxes (STBs), display devices, and network elements, etc.) separately. The functions described as being performed at various components may be performed at other components, and the various components may be combined and/or separated. Other modifications also may be made.

Figure 1:
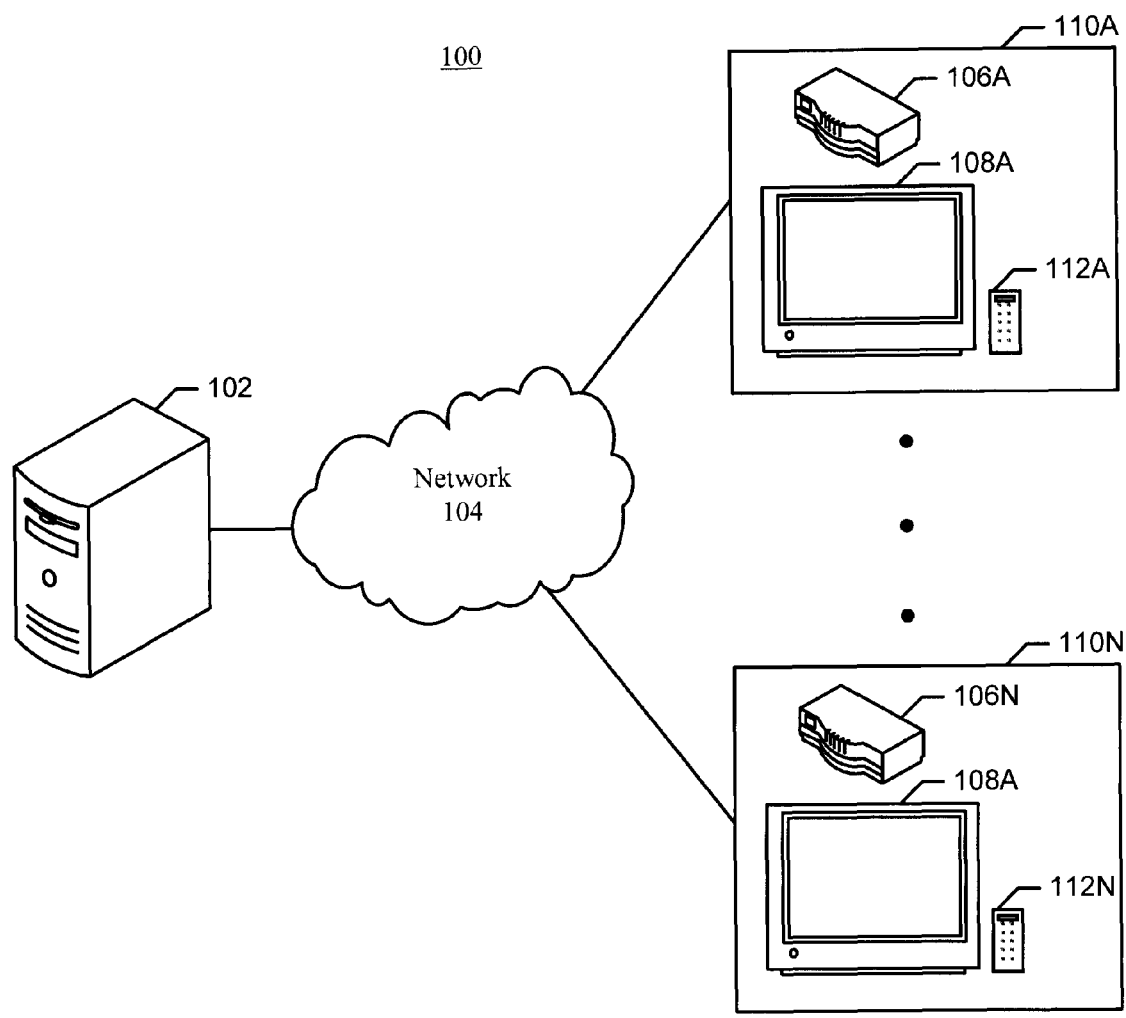
FIG. 1 illustrates a system for providing partial content, in accordance with exemplary embodiments.

FIG. 1 illustrates a system for providing partial video content data, in accordance with exemplary embodiments. The system 100 may provide different viewing options to a user. The system 100 can monitor the length of time a viewer watches a movie or other content, and can bill the user in accordance with the length of viewing. This feature, coupled with a graphical user interface (GUI) that a set top box (STB) communicates to a user, provides a user with the option of watching just a portion of a movie or other content without getting billed for the entire content.

In exemplary embodiments, the system 100 may include a server 102 communicatively coupled to a network 104, and one or more set top boxes (STBs) 106 communicatively coupled to the network 104. The network 104 may communicate content signals from the server 102 to the set top boxes (STBs) 106. The server 102 may communicate the content signal to the set top boxes (STBs) 106 via the network 104 individually or to the set top boxes (STBs) 106 as a group or sub-group. The set top boxes (STBs) 106 may be located at one or more user premises 110. In an exemplary embodiment, the server 102 may broadcast, multicast, and/or unicast the content signal.

The content signals may be, for example, television signals and/or audio signals that may be in digital or analog form, data, requests, other digital and/or analog information, and/or combinations thereof. The content signal also may include a plurality of channels, where the set top box (STB) 106 may tune to a particular channel to display the video of the channel at a display device 108, as is well known in television systems. Additionally, the viewer may use a user input device 112 (e.g., remote control, computer keyboard, computer mouse, touchscreen, etc.) to control which channel the set top box (STB) 106 causes display of the content at the display device 108. The content signal may be used to display content at the display device 108. Content may be video, audio, text, or other types of video or audio information. It is noted that the input device 112 may be integrated in either the set top box (STB) 106, the display device 108, or both.

In an exemplary embodiment, the content signal may be a cable television signal complying with the American National Standard Society of Cable Telecommunication Engineers standard ANSI/SCTE 07 2006 titled "Digital Transmission Standard for Cable Television," the contents of which are incorporated herein by reference in its entirety. The content signal also may comply with other standards and may be communicated by the network 104.

The network 104 may be a wired network, a wireless network, and/or combinations thereof. The network 104 may transport the content signal and/or various messages in analog and/or digital form from the server 102 to the set top boxes (STBs) 106. The network 104 also may transport analog and/or digital messages from the set top boxes (STBs) 106 to the server 102. In an exemplary embodiment, at least a portion of the network 104 may comply with the Telecommunication Union Telecommunication Standard (ITU-T) Recommendation G.983.1 titled "Broadband Optical Access Systems based on Passive Optical Networks (PON)," January 2005, the contents of which are incorporated herein by reference in its entirety. The network 104 also may comply with other standards. In an exemplary embodiment, the network 104 may communicate with the set top boxes (STBs) 106 using three separate carriers, where one of the carriers may exchange data using a data communication session, such as, but not limited to, Internet Protocol, another carrier may communicate content signals to the set top boxes (STBs) 106, and the last carrier may receive messages from the set top boxes (STBs) 106. The network 104 also may be a cable television network, a satellite network, fiber optics, combinations thereof, or other networks capable of distributing a content signal from the server 102 to the set top boxes (STB) 106, and exchanging information, messages, requests, etc., between the server 102 and one or more set top boxes (STB) 106 via the network 104.

The user premises 110A-N may each include a set top box (STB) 106 and a display device 108. FIG. 1 illustrates a set top box (STB) 106A and a display device 108A at user premises 110A, and a set top box (STB) 106N and a display device 108N at user premises 110N. It is also noted that a single user premise 110 may include multiple set top boxes (STBs) 106 and multiple display devices 108. The set top box (STB) 106 also may be remotely located from the display device 108.

In an exemplary embodiment, the set top box (STB) 106 may be a hardware device that may receive a content signal from the network 104, may cause display of the content signal at the display device 108, and may communicate messages to the network 104. For example, the set top box (STB) 106 may cause display of a cable television signal at the display device 108, which may be, for example, a television set or computer monitor. In another example, the set top box (STB) 106 may be a computer and the display device 108 may be a computer monitor. It is noted that the set top box (STB) 106 and the display device 108 are depicted and described as being separate devices in FIG. 1. The set top box (STB) 106 and the display device 108, however, may be combined into a single unit. The functions performed by the set top box (STB) 106 and the display device 108 also may implemented in a mobile phone, a wireless device, or any other device that may communicate via the network 104.

It is noted that system 100 illustrates a simplified view of various components included in a content distribution system, and that other hardware devices and software not depicted may be included in the system 100. It is also noted that the system 100 illustrates only a single server 102 and a single network 104. It will be appreciated that multiple instances of these devices may be used. The set top box (STB) 106 is discussed in further detail below.

Figure 2:
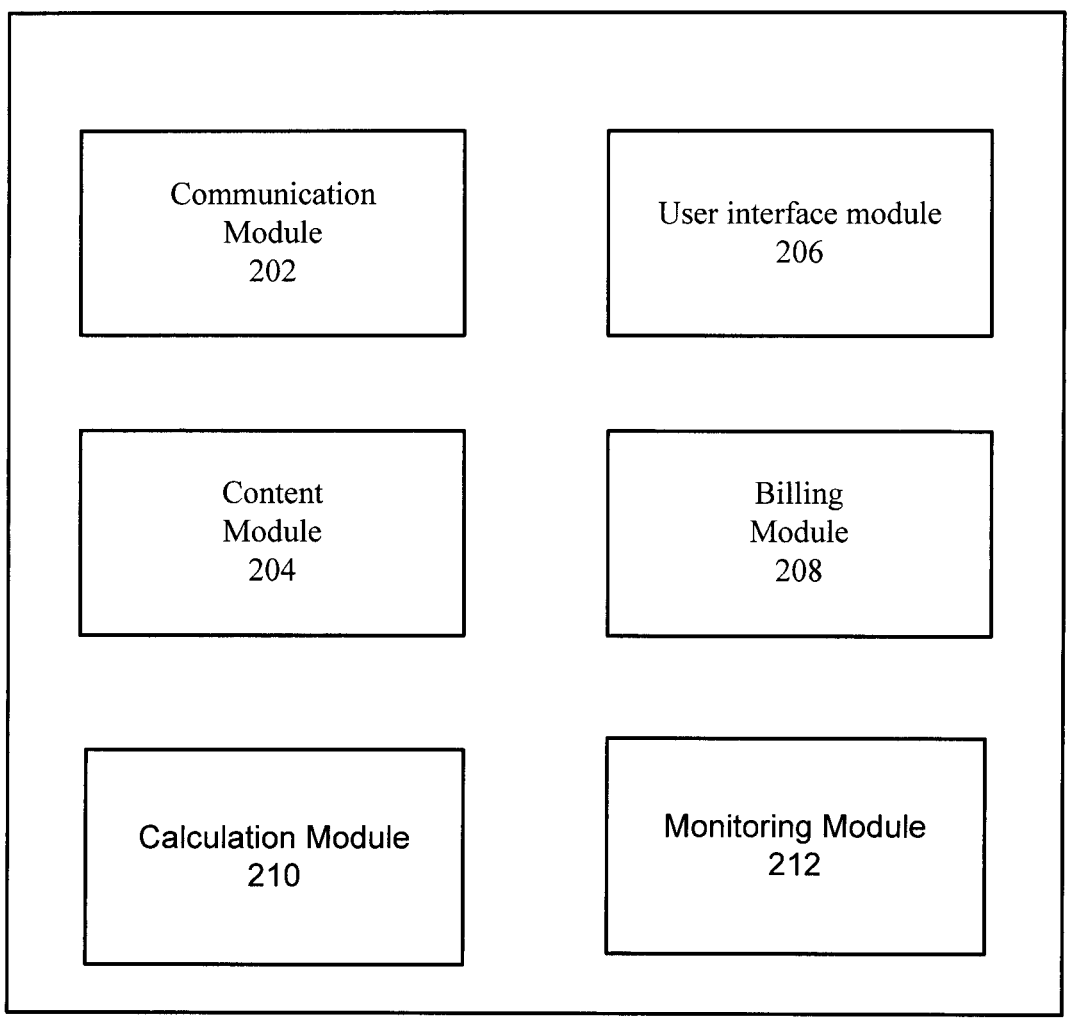
FIG. 2 illustrates various modules of a server, in accordance with exemplary embodiments.

FIG. 2 illustrates exemplary modules of a server 102 in accordance with exemplary embodiments. The server 102 may generate and communicate the content signal to the set top box (STB) 106 via the network 104. The server 102 may receive requests for video data content from multiple user premises 110A-N. The server may send video data content to the multiple premises based on these requests. The server 102 may also receive monitoring information related to the duration of a video data content viewed by a user. The server 102 may receive this information from the set top box (STB) 106. The server 102 may use this information to determine how much a user will be charged.

In an exemplary embodiment, the server 102 may include a communication module 202, a content module 204, a user interface module 206, a billing module 208, a calculation module 210, and a monitoring module 212. It is noted that modules 202, 204, 206, and 208 are exemplary. The function of modules 202, 204, 206, 208, 210, and 212 may be performed at other modules remote or local to the server 102, and the modules 202, 204, 206, 208, 210, and 212 may be combined or separated.

The communication module 202 may communicate content signals from the server 102 to the network 104. The communication module 202 also may communicate messages received from the modules 204, 206, and 208 to the network 104, and may communicate messages to the modules 204, 206, and 208 received from the network 104.

The content module 204 may generate the content signal and may communicate the content signal to the user premises 110. The content module 204 may unicast the content signal to a single set top box (STB) 106, may multicast the content signal to a group of set top boxes (STBs) 106, may broadcast the content signal to the set top boxes (STBs) 106, and/or combinations thereof.

The user interface module 206 may communicate signals from the server 102 to the set top box (STB) 106 with the communicated signals representing the video data content that is stored at the server and available for purchase and viewing. The signal communicated to the set top box (STB) can represent a graphical user interface (GUI) that allows a user to search for a particular video content or browse through available video content. The user interface module 206 may communicate a signal that allows the user to browse by category, and may be arranged in a hierarchical fashion. The user interface module 206 may communicate a signal that allows the user to search to perform a keyword or other search to locate a particular title. The user interface module 206 may periodically communicate these and other signals to the set top box (STB) 106.

The billing module 208 may receive information related to a user's viewing. Particularly, the billing module may receive information from the set top box (STB) 106 that represents the duration that a user viewed a particular content. Alternatively, the billing module 208 may receive information from the monitoring module 212. The billing module may use this duration information to calculate the amount the user is to be charged. According to an exemplary embodiment, the amount that a user is charged per-minute for time viewed decreases as the duration of the viewing portion increases. To provide a purely explanatory and non-limiting example, a user may be charged $0.08/min for the first fifteen minutes of viewing time. If the user views more than fifteen minutes, the rate may decrease to $0.06/min. The price-per-time standards may be adjusted to ensure that a user who views an entire content is not billed more than the cost of purchasing that content in its entirety. Further, the billing module uses predetermined pricing standards to calculate the amount a user is charged. These pricing figures are predetermined, but they may be different for different content. For example, newly released content may have a higher baseline pricing standard than older content. Further, the pricing figures may differ according to geographic region, or another relevant variable. It should be understood that all examples described in this paragraph are meant to be explanatory in nature and are non-limiting.

The calculation module 210 may receive monitoring information from the set top box (STB) 106. The calculation module may alternatively receive monitoring information from the monitoring module 212. The calculation module 210 may use the monitoring information to calculate a cost figure. The calculation module 210 may use predetermined pricing information and viewing duration information to calculate the amount a user should be charged. When the user selects the option of viewing a movie or other content in its entirety or viewing a pre-divided scene of a movie or other content, the calculation module 210 may not need to utilize any viewing duration information. In those cases, the charges may be predetermined.

The monitoring module 212 may monitor the selections a user has chosen to view and may further monitor the duration that those selections were viewed by the user. The selections may include an identifier that uniquely identifies the selection. Further, the monitoring module 212 may utilize calculation module 210 to determine a cost figure based on the amount of content a user has viewed. Based on information received from calculation module 210, the monitoring module may send a communication to the set top box (STB) 106 that includes the details of the fee arrangement agreement that a user must agree to before viewing content. The monitoring module 212 may communicate the monitoring information to the billing module 208.

Figure 3:
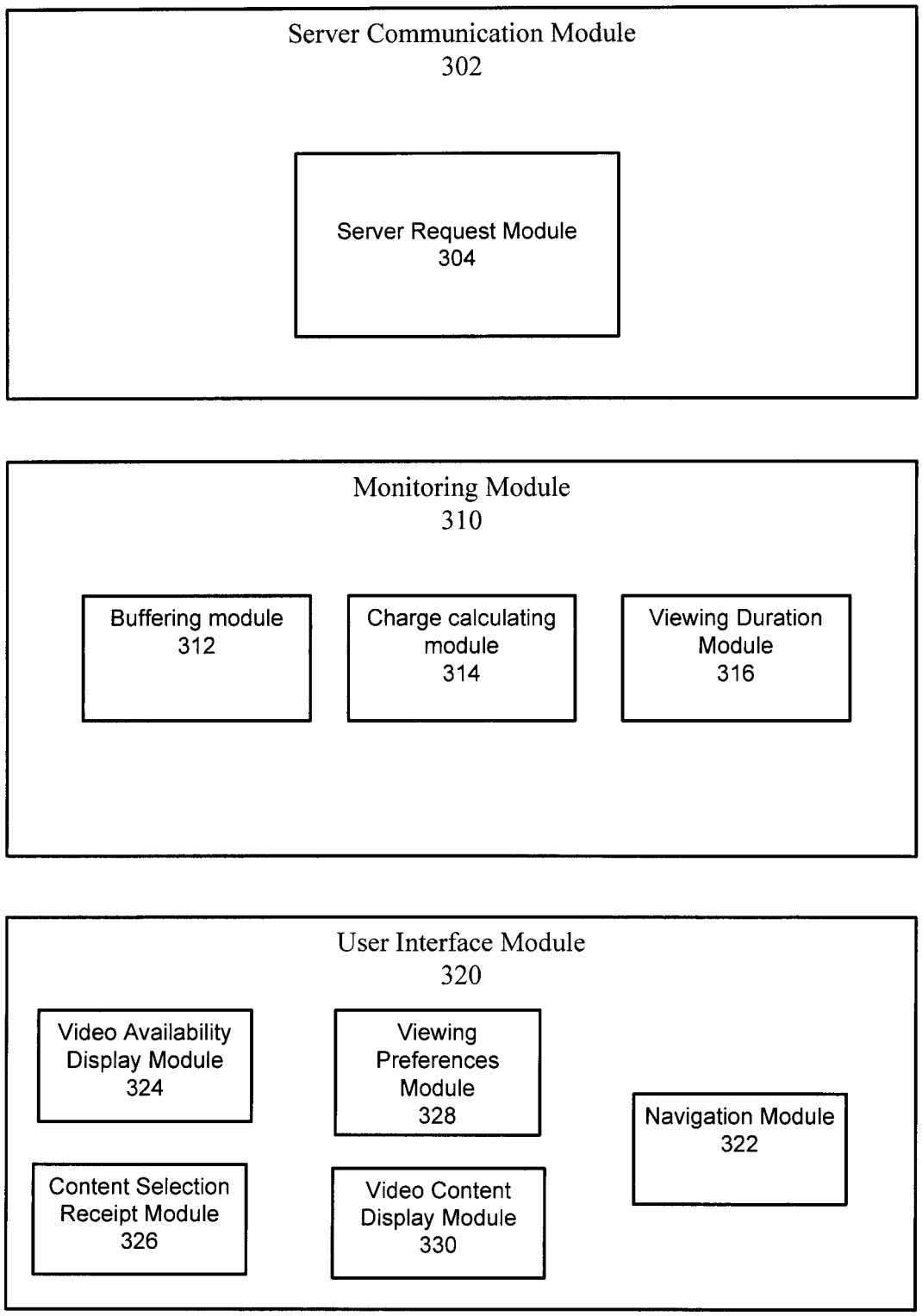
FIG. 3 illustrates exemplary modules of a set top box (STB), in accordance with exemplary embodiments.

FIG. 3 illustrates exemplary modules of a set top box (STB) 106 in accordance with exemplary embodiments. The set top box (STB) 106 communicates with both the user and the server. The set top box (STB) 106 communicates with the user by displaying interfaces that allow a user to request video content. The set top box (STB) 106 also displays graphical user interfaces (GUIs) that allow the user to choose the manner in which the user views the content (e.g., an entire movie, a selected scene, or a portion determined by the user). The set top box (STB) 106 further monitors the content viewing, including the content that the user viewed and the amount of time the user viewed the content. The set top box (STB) 106 may communicate this monitoring information with the server 102. The set top box (STB) 106 may also communicate with the server 102 by sending a request for content and then receiving the content signal from the server 102 via the network 104. The set top box (STB) 106 may also cause display of the content signal and also user communications at the display device 108.

In an exemplary embodiment, the set top box (STB) 106 may include a server communication module 302, a server request module 304, a monitoring module 310, a buffering module 312, a charge calculating module 314, a viewing duration module 316, a user interface module 320, a navigation module 322, a video availability display module 324, a content selection receipt module 326, a viewing preferences module 328, and a video content display module 330. It is noted that modules 302, 304, 310, 312, 314, 316, 320, 322, 324, 326, 328, and 330 are exemplary. The function of the modules 302, 304, 310, 312, 314, 316, 320, 322, 324, 326, 328, and 330 may be performed by other modules remote or local to the set top box (STB) 106, and the modules 302, 304, 310, 312, 314, 316, 320, 322, 324, 326, 328, and 330 may be combined or separated. The function of the modules 302, 304, 310, 312, 314, 316, 320, 322, 324, 326, 328, and 330 may be performed by the server 102. Further, it is noted that any of modules 302, 304, 310, 312, 314, 316, 320, 322, 324, 326, 328, and 330 may be communicatively coupled with one another.

The server communication module 302 may provide communication between the set top box (STB) 106 and the server 102 via the network 104. The communication module may forward the content signal and/or messages received from the network 104 to the other modules 304, 310, 312, 314, 320, and 322, and may communicate messages received from the modules 304, 310, 312, 314, 320, and 322 to the server 102 via the network 104. The server communication module 302 may utilize the server request module 304 to generate request messages to be sent to the server.

The server request module 304 may generate service request messages based on selections made by the viewer using the user input device 112. The user interface module 320 may cause display of graphical user interfaces (GUIs) that permit a user to select a particular content. When the user has selected a particular content, the request module 304 may receive a selection message based on the user's selection, may generate a service request message identifying the desired content, and the service request message may be forwarded to the server via the server communication module 302.

The monitoring module 310 may monitor the selections a user has chosen to view and may further monitor the duration that those selections were viewed by the user. The selections may include an identifier that uniquely identifies the selection. The monitoring module 310 may store monitoring data in the buffering module 312. Further, the monitoring module 310 may utilize charge calculating module 314 to determine a cost figure based on the amount of content a user has viewed. Based on information received from the charge calculating module 314, the monitoring module may send a communication to the user interface module 320 that includes the details of the fee arrangement agreement that a user must agree to before viewing content. The monitoring module may communicate the monitoring information to the server 102 via the server communication module 302.

The buffering module 312 may buffer a predefined amount of monitoring data before generating a monitoring message for communication to the server 102. The monitoring message may include the monitoring data and may also include a set top box (STB) identifier that uniquely identifies the set top box (STB) 106 sending the monitoring message. The set top box (STB) identifier may be a number sequence, a letter sequence, a symbol sequence, combinations thereof, and/or other information to uniquely identify the set top box (STB). The buffer module 208 may communicate the monitoring message at predefined intervals (e.g. every minute, every hour, every day), in real time, and/or upon other time intervals or other events relating to the user's selection of content and length of viewing.

The charge calculating module 314 may use predetermined pricing information and viewing duration information to calculate the amount a user should be charged. The charge calculating module may be communicatively coupled with the viewing duration module 316 and may use data received from the viewing duration module 316 to calculate the amount a user should be charged. When the user selects the option of viewing a movie or other content in its entirety or viewing a pre-divided scene of a movie or other content, the charge calculating module 314 may not need to utilize any viewing duration information. In those cases, the charges may be predetermined. These predetermined charges may be stored locally in the charge calculating module or may be received from the server 102. If the charge calculating module 314 stores this information, then it may receive periodic updates regarding this information from the server 102.

The viewing duration module 316 may keep track of the length of the portion viewed by the user. The viewing duration module 316 may be communicatively coupled with any of the other modules or sub-modules depicted in FIG. 3.

The user interface module 320 communicates with the user, the monitoring module 310, and the server communication module 302. The user interface module 320 may receive content availability information from the server 102 and cause this information to be displayed to the user in the form of a graphical user interface (GUI). The user interface module receives selections from the user and communicates those selections to the server request module 304. For example the user may use a remote control device or a touchscreen. Other input devices also may be used, such as, but not limited to, voice activated or gesture activated input devices. The user interface module 320 may then cause content received from the server 102 to be displayed to the user. The user interface module 320 may also cause a graphical user interface (GUI) to be displayed to the user that requests the preferred viewing information for the content they selected. If the user wishes to select a predivided scene from a particular content, the user interface module 320 may cause the display to present the user with a visual presentation of all the predivided scenes that the user may choose from. If the user wishes to navigate through selected content, the user interface module 320 may utilize the navigation module 322 to navigate through the movie.

The navigation module 322 may allow the user to navigate through the content they have selected to find a point at which they would like to start viewing. The navigation module 322 may provide a navigation display to facilitate navigation. The navigation module 322 may operate for a pre-defined time. In other words, the user may only have a given amount of time with which to select their starting point. The navigation module 322 may allow the user to skip through the content by skipping forward and backward through pre-divided scenes, and also fast-forwarding and rewinding through the content. The user may use these tools to find a viewing start point. Once the user has found a viewing start point, the navigation module 322 may communicate that starting point to the monitoring module 310.

The video availability display module 324 may cause the display device to display a GUI which provides the user with a mechanism for browsing through the available video content or searching for a specific video content. The GUI may present available video content which has been categorized.

The content selection receipt module 326 may receive data that represents the video content selected by the user. The content selection receipt module 326 may send this data to the server communication module 302.

The viewing preferences module 328 may cause the display device to display a GUI which provides the user with a mechanism for selecting the manner that they wish to view the selected content. The viewing preferences module 328 may cause the display device 108 to present the user with the option of viewing a selected content in its entirety. The viewing preferences module 328 may cause the display device 108 to present the user with the option of viewing a pre-defined portion of the selected content. The viewing preferences module 328 may cause the display device 108 to present the user with the option of navigating through the content to determine what portion of the selected content they wish to view. In this scenario, the display of the viewing preferences module 328 may be communicatively coupled with the navigation module 322. If the user requires navigational capabilities, the viewing preferences display provided by the viewing preferences module 328 may be substituted by the navigation display provided by the navigation module 322.

The video content display module 330 may cause the display device to display the content selected by the user for viewing.

Figure 4:
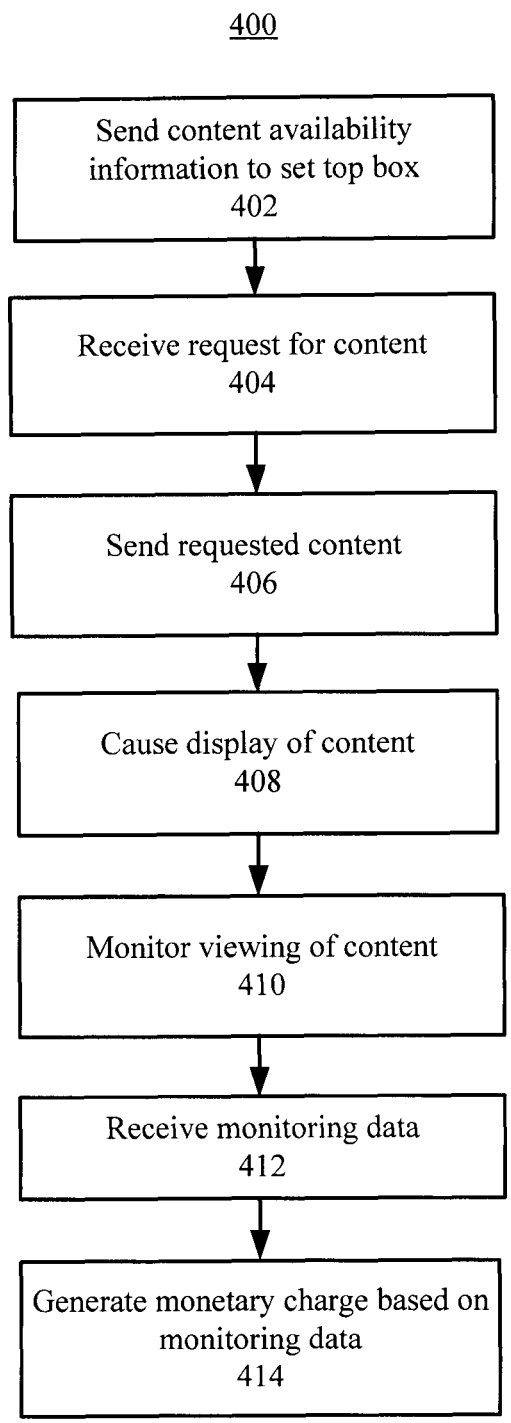
FIG. 4 illustrates a method for communicating monitored usage data, in accordance with exemplary embodiments.

FIG. 4 illustrates a method for communicating monitored usage data in accordance with exemplary embodiments. This exemplary method is provided by way of example, as there are a variety of ways to carry out methods disclosed herein. The method 400 shown in FIG. 4 can be executed or otherwise performed by one or a combination of various systems. The method 400 is described below as carried out by the system 100 shown in FIG. 1 by way of example, and various elements of the system 100 are referenced in explaining the example method shown in FIGS. 6(*a*)-6(*c*). Each block shown in FIG. 4 represents one or more processes, methods, or subroutines carried in the exemplary method 400.

In block 402 content availability information is sent to the set top box (STB) 106. In an exemplary embodiment, this information may be sent periodically at predetermined times. The information may alternatively be sent upon request from the set top box (STB) 106. The information comprises the content that the server 102 has available for a user to purchase. The information may also comprise a graphical user interface (GUI) for presenting the content availability information. The set top box (STB) 106 causes this content availability information to be displayed at the user's display device 108.

In block 404, the server 102 receives a request for content. In an exemplary embodiment, this information may be sent from the set top box (STB) 106 to the server 102, after a user selects a particular movie or other content that they would like to view. The user may make this selection using the input device 112 to navigate through the graphical user interface (GUI) that displays the available content.

In block 406, the server sends the requested content to the set top box (STB) 106. The server 102 may send this requested content to the set top box (STB) 106 in response to receiving a request for content. The server may locate the requested content and send the requested content to the set top box (STB) 106 that requested the content. In block 408, the set top box (STB) 106 then causes this content to be displayed to the user on display device 108. In block 410, the set top box (STB) 106 also monitors the viewing of the content to determine whether the user viewed the entire content, and if the user did not view the entire content, to determine how much content was viewed.

In block 412, the server receives monitoring data from the set top box (STB) 106. The contents of the monitoring data will be further discussed below. The server may use this monitoring data to calculate a cost figure. The server may use this monitoring data for various reasons. For instance, even if the monitoring data was not used to calculate the monetary charge to be billed to the user (e.g., if those calculations were performed on the set top box (STB) 106), the monitoring data may still be used for other reasons such as analyzing viewership trends, or determining the popularity of certain content.

In block 414, the server may generate a monetary charge based on monitoring data. In an exemplary embodiment, the server may rely upon predetermined pricing structures wherein each individual content has an associated viewing fee. The server may also rely upon the monitoring data including the length of the portion viewed by the user. The user may be charged for the portion that was viewed if the user opted to view the content on a partial basis.

Figure 5:
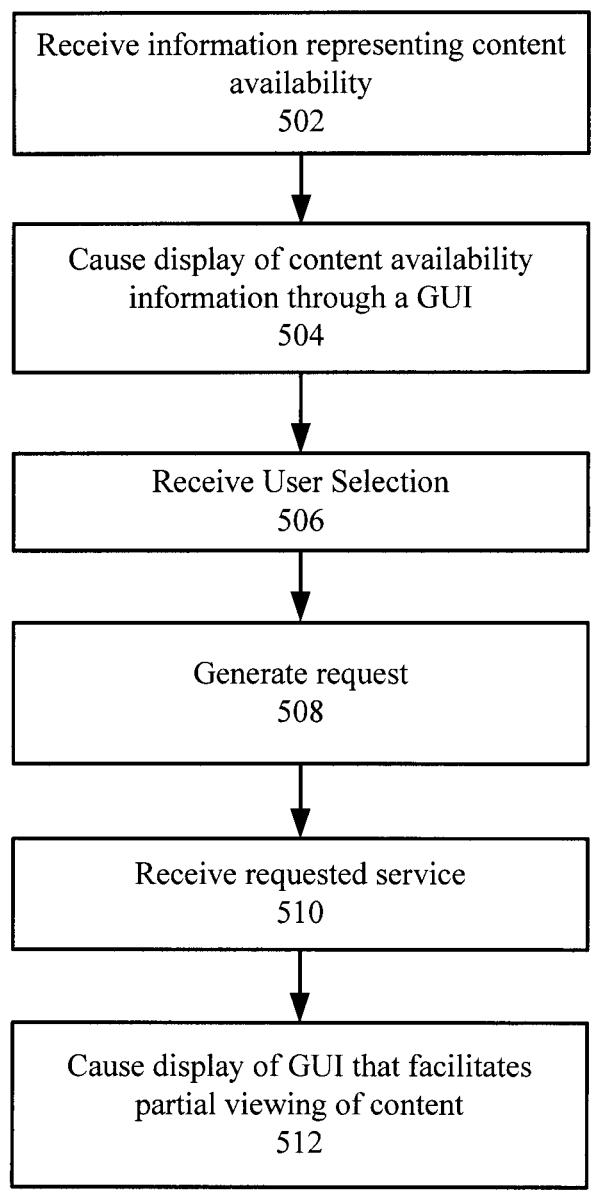
FIG. 5 illustrates a method for providing partial viewing capabilities, in accordance with exemplary embodiments.

FIG. 5 illustrates a method for providing partial viewing capabilities in accordance with exemplary embodiments. The method is a high-level description of the steps taken by the set top box (STB) 106 in the overall process. A lower-level, more detailed analysis of the partial viewing system is provided in FIG. 6. This exemplary method is provided by way of example, as there are a variety of ways to carry out methods disclosed herein. The method 500 shown in FIG. 5 can be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods, or subroutines carried in the exemplary method 500.

In block 502, the set top box (STB) 106 receives information representing content availability from the server 102. In an exemplary embodiment, this information may be received on a periodic basis to ensure that the information presented to the user is accurate and timely. The received information need not represent the entire collection of what is available, but rather could simply supplement information previously received from the server. As a non-limiting example, the set top box (STB) may receive supplemental information representing new releases that are now available for viewing. In another exemplary embodiment, the information may further comprise a graphical user interface (GUI) for presenting the content availability information. In another exemplary embodiment, the information is logically organized and/or indexed to facilitate the retrievability of available content.

In block 504, the set top box (STB) 106 may cause a graphical user interface (GUI) to display the content availability information. Information describing the layout and organization of the graphical user interface (GUI) may be received from the server 102 or stored in the set top box (STB) 106. In an exemplary embodiment, a user may browse or navigate through the graphical user interface (GUI) with the user input device 112 and find a selection the user wishes to view. In another exemplary embodiment, the user may search for a title directly using a keyword search or an alternative retrieval search.

In block 506, the set top box (STB) 106 may receive a user selection. As described in the above paragraph, the user may make a selection in an exemplary embodiment by browsing through or searching in a graphical user interface (GUI) using an input device 112.

In block 508, the set top box (STB) 106 may use the information received from the selection to generate a request for the selected content. In an exemplary embodiment, this request may be sent to the server 102, which may then send the content to the set top box (STB) 106 via the network 104.

In block 510, the set top box (STB) 106 may receive the requested service. In an exemplary embodiment the received requested service may comprise the data content corresponding to the user's selection.

Figure 8:
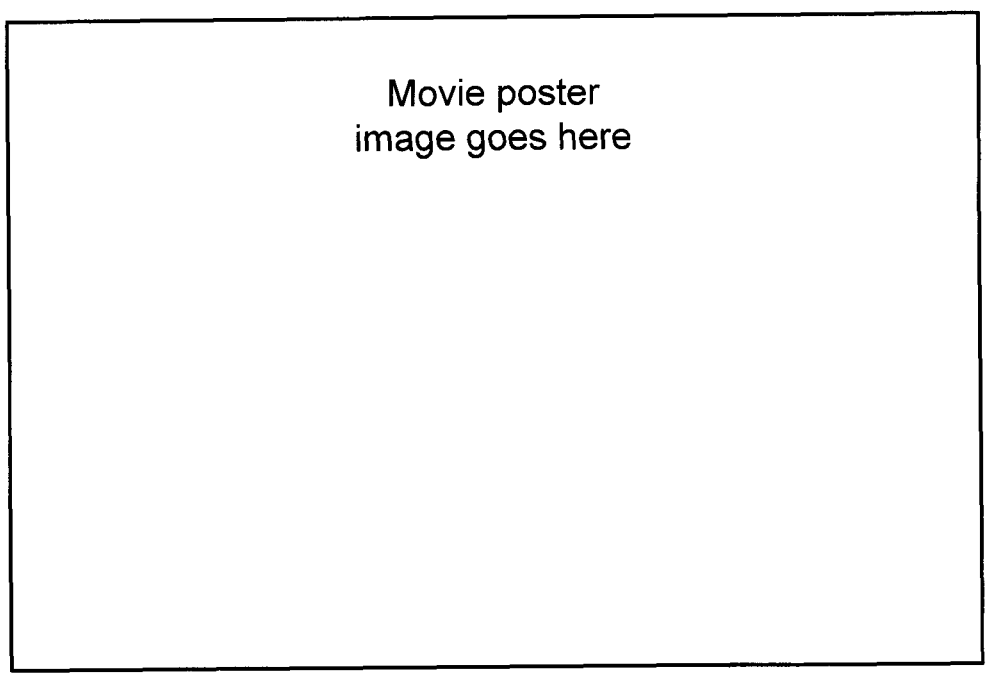
FIG. 8 is a screenshot of a graphical user interface (GUI) that provides the user with viewing options, in accordance with exemplary embodiments.
Figure 8:
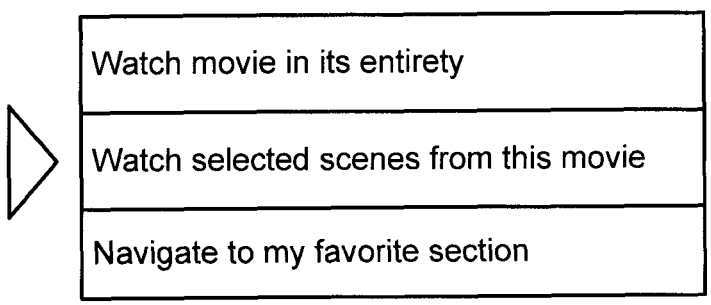

In block 512, the set top box (STB) 106 may cause the display of a graphical user interface (GUI) that facilitates partial viewing of the requested content. A non-limiting, exemplary graphic is shown in FIG. 8. This graphic may be just one of a multitude of ways that a graphical user interface (GUI) could facilitate partial viewing of selected content.

Figure 6A:
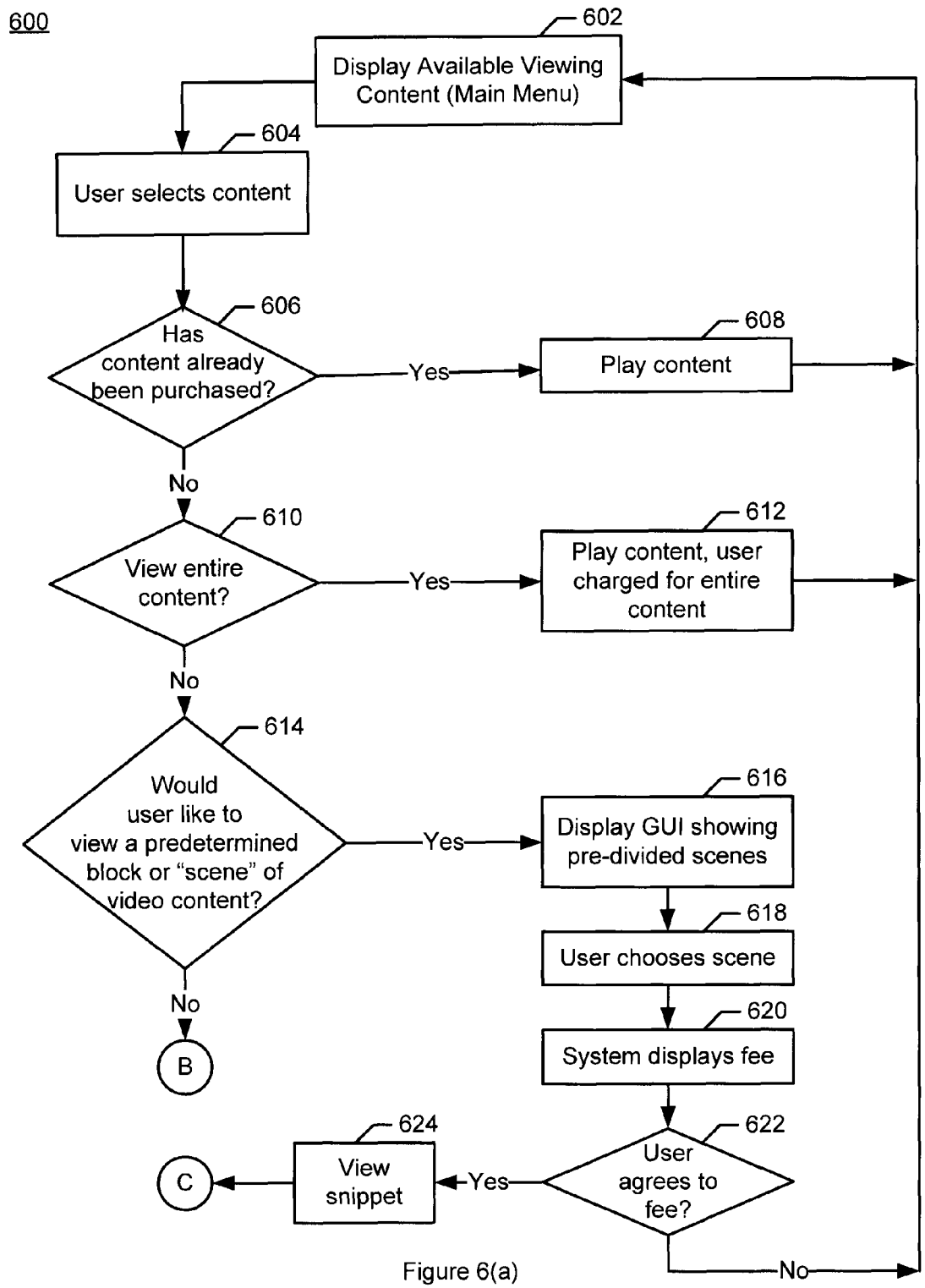
FIG. 6(a) is a flowchart illustrating how portions of video content may be selected, in accordance with exemplary embodiments.
Figure 6B:
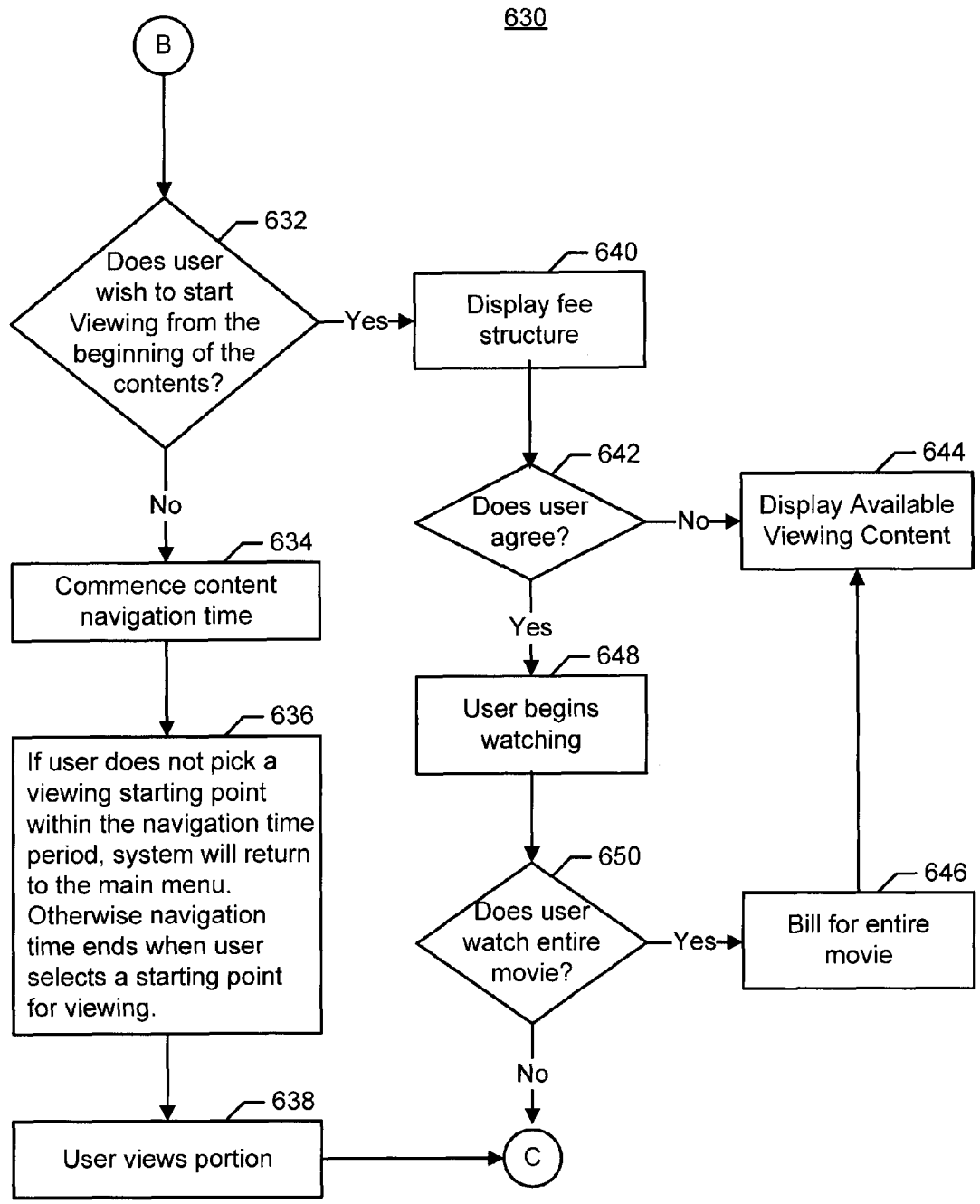
FIG. 6(b) is a flowchart illustrating how a user can navigate through digital content to find and view their favorite portions, in accordance with exemplary embodiments.
Figure 6C:
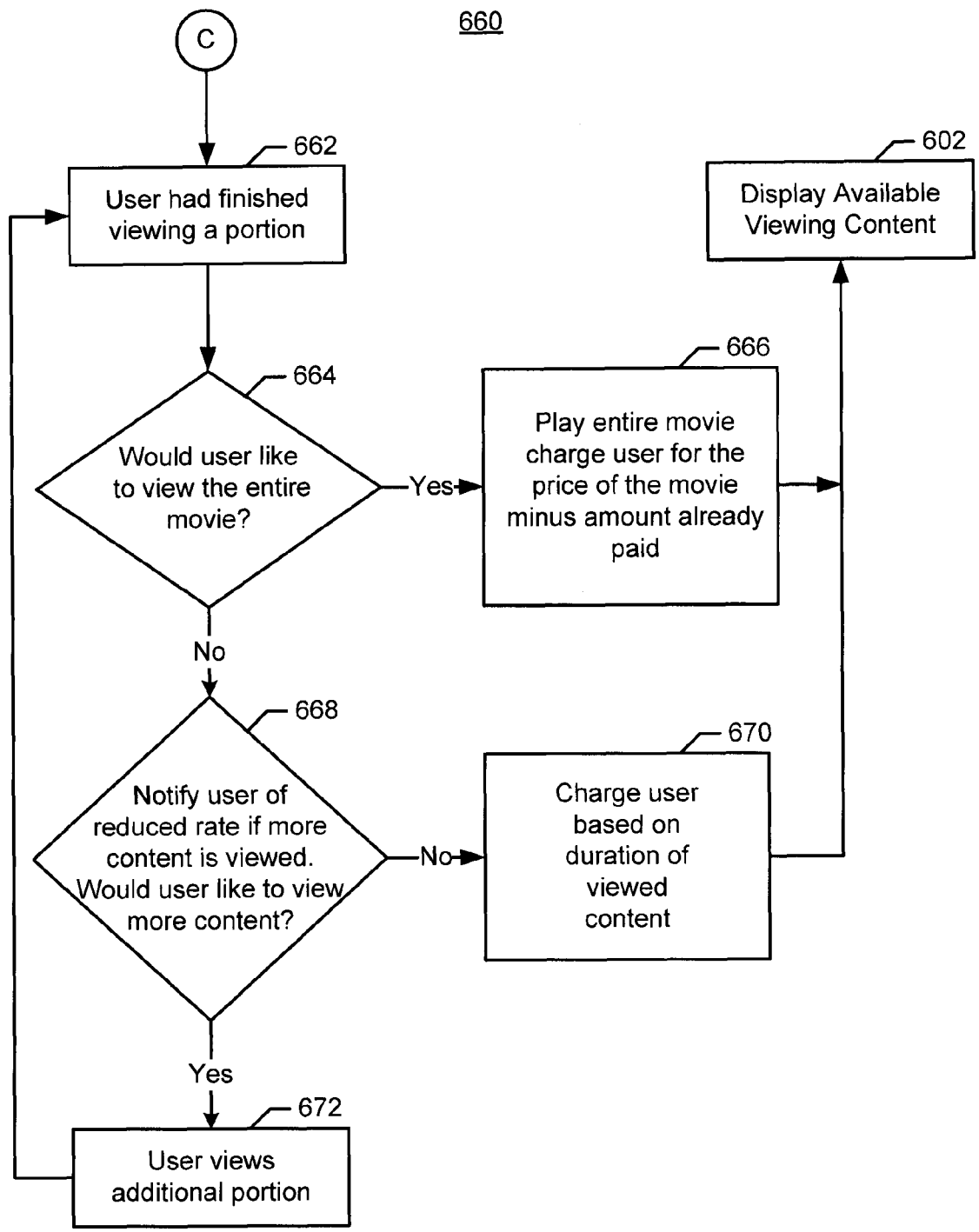
FIG. 6(c) is a flowchart illustrating a user's options after a portion of video content has been viewed, in accordance with exemplary embodiments.

FIGS. 6a-6c represent a detailed flowchart that illustrates the steps associated with providing a system/method for partial viewing of data content. FIG. 6 represents an exemplary embodiment and is not meant to be limiting. FIG. 6 is broke up into three parts. FIG. 6(a) illustrates how the system begins from a display that allows the user to browse or search available content, and gives the user the option of viewing a movie or other content in its entirety or viewing pre-defined "scenes" of a movie or other content. FIG. 6(b) illustrates how a user can navigate through the content and find a starting point for viewing. FIG. 6(c) illustrates the different options provided to the user after a snippet has been viewed.

FIG. 6(a) begins at block 602 as the display device 108 provides a graphical user interface (GUI) that may provide options that allow the user to browse or search through available content. An example of the layout of such a graphical user interface (GUI) is depicted in FIG. 7. At block 604, the user uses input device 112 to select the content they want to view. At block 606, the system determines whether the content has already been purchased. This determination may be made by the set top box 106, the server 102, or both the set top box (STB) 106 and the server 102 working together as a single unit.

The determination in block 606 may vary based on alternative embodiments. In an exemplary embodiment, the system may allow the user to purchase content and then give the user a fixed amount of time in which the user can view that content. With this arrangement, the user is essentially renting the content.

In another exemplary embodiment, the system may allow for the viewer to purchase the content for indefinite viewing. In other words, the user could purchase the content and it could be stored locally on the user premises 110. It may be stored on the set top box (STB) 106, or it may be stored in a separate storage device coupled with the set top box (STB) 106. The user could then access that content whenever the user wanted, and there would be no time constraints associated with it.

In the "renting" example, the system may give the user a 24-hour window to watch the content as many times as the user may wish. In that example, the answer to question posed in block 606 would be "yes" if the user is still in the 24-hour window, but it would be "no" once that window has ended. If the system determines that the content has already been purchased, the content is played as shown in block 604. Otherwise, the flowchart proceeds to block 610.

In block 610, the display device 108 may provide the user with the option of viewing the entire content. If the user wishes to view the entire content, the user can do so, and the user can view the entire content and is billed for the entire content.

If the user does not wish to view the entire content, the display device 108 may provide the user with the option, as shown in block 614, of viewing a predetermined block or "scene" of video content.

In question block 614, the user is asked whether they would like to view a predetermined block or "scene" of the movie or other content. If the user chooses this option, the set top box (STB) 106 may send information to the display device 108 so that the display device 108 may display images or text that identify pre-divided scenes. The user may utilize the input device 112 to select one of these pre-divided scenes or portions. In an exemplary embodiment, the images or text representing the predivided scenes may be accompanied by information describing the price of viewing each scene. In an alternative embodiment, this fee information may be shown after the user has selected a "scene." In either embodiment, the user agrees to the fee before the viewing process begins. It should be noted that the fee can vary based on whether the viewer is choosing to "rent" the scene for a predetermined amount of time, or whether the user is "buying" the scene, in which case the scene may be stored locally on the set top box (STB) 106 or on another storage device that may be operatively coupled with the set top box (STB) 106.

In an exemplary embodiment, after the snippet has been viewed, the system may proceed to the "post-snippet" process 660 described in FIG. 6(*c*).

In block 614, if the user does not wish to view a pre-divided scene, then the system may proceed to the snippet selection process 630, which is described in FIG. 6(*b*).

FIG. 6(*b*) illustrates a snippet selection process 630 in accordance with exemplary embodiments. In this exemplary embodiment, the user has flexibility to determine the portion or "snippet" of the content that the user wishes to view.

In an exemplary embodiment, block 632 may be the starting point. The display device 108 provides the user with the option of viewing the content from the starting point of the content. If the user wishes to start viewing at the beginning of the content, the user may be presented with information-displayed on the display device 108 (see block 640)—describing the fees associated with viewing. The user may have to agree to the fee arrangement before viewing the content.

There are various embodiments in which the fee arrangement information may be communicated to the user via the display device 108.

In a first embodiment, the user is presented with comprehensive fee information at the outset. In block 640, the fee structure is presented to the user by the display device 108. The comprehensive fee information may provide the user the cost to view the content per viewing, how the cost/time-viewed priced may change as the viewing duration increases, and how the fees for viewing any portion of the move less than its entirety may not exceed the cost of purchasing the move in its entirety. The user may watch the content uninterrupted by any prompts from the system. The user may watch the entire content. If the user does watch the entire content, the user may be billed the cost of that content. If the user views less than the entire content, the user may be billed for the portion that they viewed in accordance with the agreed-upon fee structure.

In a second embodiment, the system may define a predetermined "snippet time," and after the user views the content for that amount of time, the system may prompt the user and ask if they would like to continue to view the content. The system may also cause the display device 108 to display the rate for continued viewing. The system may also cause the display device 108 to provide the user with the option of purchasing the entire movie. In this embodiment, less comprehensive fee information may be provided to the user at the outset. It follows that there may be less that the user has to read and consent to before proceeding.

If a user does not wish to view the content from the beginning, then the flowchart moves to block 634. Block 634 is the step where a user may begin a navigation session where the user may navigate through the content for a predetermined amount of navigation time. The length of the navigation session may be determined by the set top box (STB) 106 or by the server 102.

The navigation session provides the user with a predetermined amount of time to find a starting point for their viewing. In an exemplary embodiment, the user may navigate by skipping through scenes, fast forwarding, rewinding, or the like. The user may use the input device 112 to accomplish these navigation functions.

In block 636, if the user does not find a starting point in the allotted navigation time period, the display device 108 will display a graphical user interface (GUI) showing the available content for viewing. Further describing block 636, the navigation time may end once the user selects a starting point for viewing.

In block 638, a user has selected a starting point for viewing. Viewing of the content may then commence at that time.

In one embodiment, the system may provide the user with comprehensive fee information at the outset. The fee structure is presented to the user by the display device 108. The comprehensive fee information may provide the user the cost to view the content per viewing, how the cost/time-viewed priced may change as the viewing duration increases, and how the fees for viewing any portion of the move less than its entirety may not exceed the cost of purchasing the move in its entirety. The user may watch the content uninterrupted by any prompts from the system. The user may watch the entire content. If the user does watch the entire content, the user may be billed the cost of that content. If the user views less than the entire content, the user may be billed for the portion that they viewed in accordance with the agreed-upon fee structure.

In a second embodiment, the system may define a predetermined "snippet time," and after the user views the content for that amount of time, the system may prompt the user and ask if the user would like to continue to view the content. The system may also cause the display device 108 to display the rate for continued viewing. The system may also cause the display device 108 to provide the user with the option of purchasing the entire movie. In this embodiment, less comprehensive fee information may be provided to the user at the outset. It follows that there may be less that the user has to read and consent to before proceeding.

The user may choose whether they would like to view the content without interruptions. If the user does not choose interrupted viewing, the user may define a "snippet" time, which is the length of time a user views selected content before they are prompted by the system. Alternatively, the user may choose not to define such a time length. In that case, the system would rely on default "snippet" time settings.

In an exemplary embodiment, after a user views a portion or "snippet" of the content the system may proceed to the "post-snippet" process 660 described in FIG. 6(*c*).

In block 662 a user has finished viewing a portion of the content.

In block 664, the display device 108 prompts the user on whether the user wishes to view the entire content. If the user wishes to view the entire content, the entire content is played and the user is charged for the regular price of the movie or other content. In an exemplary embodiment as shown in block 666, the user may be charged for the price of the entire movie minus any charges associated with partial viewership that the user has already incurred.

In block 668, the user has indicated that the user does not wish to view the entire movie content. The user may make this selection by sending a signal to the set top box (STB) 106 with the input device 112.

In accordance with an exemplary embodiment, if the user declines to view the entire content, the system may proceed to block 668 where the system may notify them of cost-per-minute reductions if they continue to view more content. They system may then ask user if they would like to view more content. In an exemplary embodiment, the user may choose to continue viewing from where they left off. Alternatively, the viewer may wish to view a different scene, or navigate to a different portion of the content. The system may provide the user with graphical user interfaces (GUI's), as have been previously discussed, that may allow the user to select content in these two manners.

As is shown in block 670, if the user declines the option of viewing further content, the user may be charged based on the duration of the viewed portion The server 102 or the set top box (STB) 106 may then cause the display of the graphical user interface (GUI) that facilitates browsing or searching available content.

FIG. 7 illustrates an on-demand graphical user interface (GUI) in accordance with exemplary embodiments. The on-demand graphical user interface (GUI) 700 may permit the viewer to instruct the set top box (STB) 106 to retrieve an on-demand program for display at the display device 108. The user may access and navigate the on-demand graphical user interface (GUI) 700 using their input device 112. An on-demand program may generally refer to a program communicated by the server 102 to the set top box (STB) 106 at a time of the viewer's choosing. It should be noted that any data organization or searching methods depicted in FIG. 7 are merely exemplary and are in no way meant to be exhaustive or limiting in any way.

The on-demand graphical user interface (GUI) may be displayed in response to a viewer request to view the on-demand graphical user interface (GUI) 700. For example, the viewer may use the user input device 112 to generate an on-demand display request that requests the set top box (STB) 106 to cause display of the on-demand graphical user interface (GUI) 700 at the display device 108. When the on-demand display request is received, the display module 206 of the set top box (STB) 106 may examine the on-demand lineup data received in the on-demand lineup message from the server 102 to generate the on-demand graphical user interface (GUI) 700.

The on-demand graphical user interface (GUI) 700 may allow a user to browse through available titles or search for those titles directly. The available content may be indexed according to category and the user may browse the content this way. Alternatively, the user may browse the available content alphabetically. The on-demand graphical user interface (GUI) 700 also allows the user to search directly for a title. As is shown in FIG. 7, the user may use a keyword search to search directly for the title of the content, or, alternatively, may search for content based on actors, producers, or other relevant identifying information. The graphical user interface (GUI) can be presented to the user with a multitude of different presentations and the information can be organized in any multitude of ways.

FIG. 8 illustrates how a viewing preferences graphical user interface (GUI) 800 may appear to a user in accordance with exemplary embodiments. It should be noted that the viewing preferences graphical user interface (GUI) 800 illustrated in FIG. 8 is merely exemplary. The user could be presented with these options with a multitude of different graphical presentations. This graphical user interface (GUI) may appear to the user after they have selected content for viewing. The graphical user interface (GUI) has a graphic that represents or identifies the content selected by the user. The graphical user interface (GUI also may give the user the option of viewing this content in its entirety, watching selected scenes from the movie or other content, or navigating to a particular section of the selected movie or other content. The user may navigate through these selections using the input device 112. The user's selections are communicated to the set top box (STB) 106, which takes appropriate action in accordance with the selection. For example, if the user decides to select pre-divided scenes, the user interface module 320 will cause display of a graphical representation of the scenes on the display 108, which the user will then use to select the scene. Alternatively, if the user decides to navigate through the contents, the user interface module 320 will utilize the navigation module and cause display of the navigation functionality.

Figure 9:
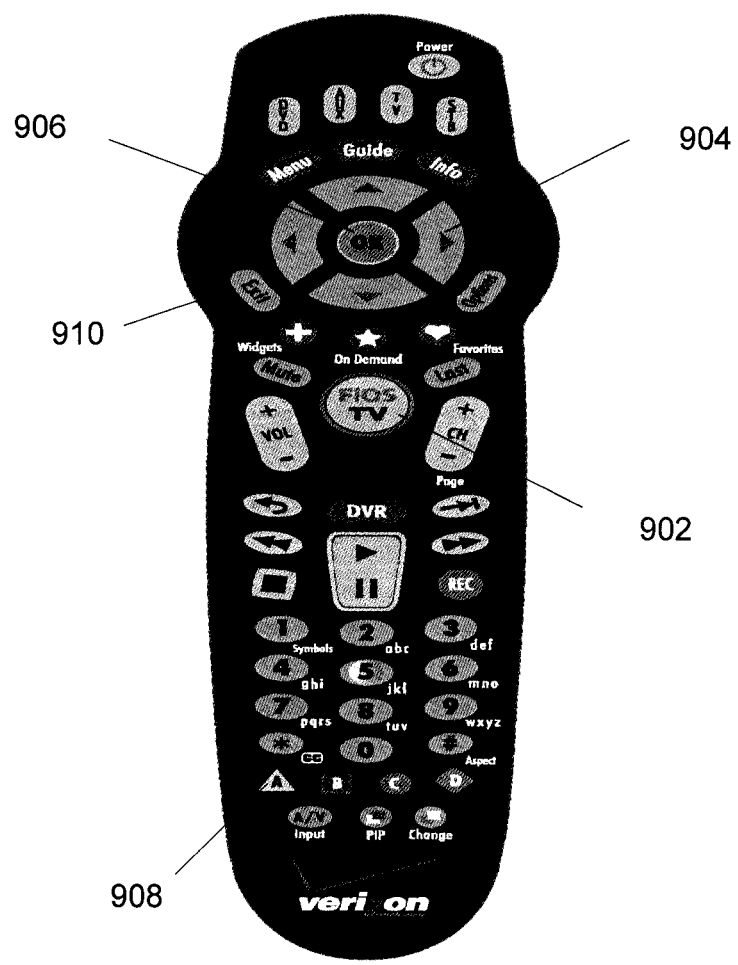
FIG. 9 illustrates an input device in accordance with exemplary embodiments.

FIG. 9 illustrates an input device in accordance with exemplary embodiments of the present disclosure. The commands may be, for example, a display graphical user interface (GUI) command 902, one or more navigation commands 904, a selection command 906, and an exit command 910. The exit command 910 may communicate a termination identifier to exit out of a display of a graphical user interface (GUI), the display graphical user interface (GUI) command 902 may instruct the set top box (STB) 106 to cause the display of a graphical user interface (GUI), the one or more navigation commands 904 may be arrows for scrolling through and highlighting various fields of a graphical user interface (GUI), and the selection command 906 may select a particular field within the graphical user interface (GUI). It is noted that the input device 112 is depicted as being a remote control with keys that may be pressed by a user. The input device 112 also may include a touchscreen where the viewer may touch an icon on a display (e.g., on display device 108). Other input devices also may be used, such as, but not limited to, voice activated or gesture activated input devices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
providing data associated with a plurality of available video content to a display device for display to a user, wherein each of the plurality of available video content is pre-divided into a plurality of portions that are associated with a plurality of pre-defined view fees;
providing, to a display device for display to a user, the option of viewing a portion of one of the plurality of available video content;
providing a video content selection to the display device;
providing information to the display device, in response to a signal indicating that a user has completed viewing a portion of the video content selection, that presents the user with the option of viewing the video content selection in its entirety;
monitoring the viewing of the video content selection and compiling monitoring data therefrom,
acquiring viewing duration data from the compiled monitoring data representing the duration of the portion of the video content selection that was viewed; and
determining a monetary charge based at least in part on the viewing duration data.

2. The method of claim 1 further comprising sending information, to a display device for display to a user, that represents at least one billing rate and requests information representing consent to the at least one billing rate.

3. The method of claim 1, wherein the video content selection is pre-divided into portions.

4. The method of claim 1, further comprising providing, to a display device for display to a user, a navigation menu.

5. The method of claim 1 further comprising providing information to a display device, in response to a signal indicating that a user has completed viewing a portion of the video content selection, that presents the user with the option of viewing additional portions of the video content selection.

6. The method of claim 1, wherein the cost of viewing per minute decreases as the duration of the viewed portion increases.

7. The method of claim 1, wherein the data associated with a plurality of available video content is categorized.

8. A non-transitory computer readable medium storing an executable program comprising instructions to perform the acts of the method of claim 1.

9. The method of claim 2 further comprising providing the video content selection to a display device in response to receiving the consent information.

10. The method of claim 3, wherein the option of viewing a portion of the video content selection includes the option of viewing a pre-divided portion.

11. The method of claim 4, further comprising receiving information representing the point in the video content selection where a portion begins.

12. The method of claim 4, wherein the user uses the navigation menu to select the point in the video content selection where a portion begins.

13. The method of claim 4, wherein the navigation menu has an associated predetermined time limit for display.

14. The method of claim 4, wherein the navigation can be accomplished by fast-forwarding through the video content selection, rewinding through the video content selection, or skipping through pre-divided portions of the video content selection.

15. The method of claim 6, further comprising causing the display of a graphical user interface presenting the categorized data associated with a plurality of available video content.

16. A system comprising:
a video availability display module configured to provide data associated with a plurality of available video content to a display device for display to a user, wherein each of the plurality of available video content is pre-divided into a plurality of that are associated with a plurality of pre-defined view fees;
a content selection receipt module configured to receive a video content selection associated with the user;
a viewing preferences module configured to provide, to a display device, the option of viewing a portion of the video content selection;
a video content display module configured to provide the video content selection to a display device for display to a user and to provide information to the display device, in response to a signal indicating that a user has completed viewing the portion of the video content selection, that presents the user with the option of viewing the video content selection in its entirety;
a monitoring module configured to monitor the viewing of the video content selection and compiling monitoring data therefrom;
a viewing duration module configured to acquire viewing duration data from the compiled monitoring data representing the duration of the portion of the video content selection that was viewed; and
a billing module for determining a monetary charge based at least in part on the viewing duration data.

17. A method comprising:
sending information representing a plurality of available video content, wherein each of the plurality of available video content is pre-divided into a plurality of portions that are associated with a plurality of pre-defined view fees;
receiving a request for specific video content;
sending information representing the requested video content, wherein said requested video content is viewed in portions;
receiving monitoring information that includes viewing duration information for the specific video content, wherein the duration information represents at least the duration of portions of the requested video content that are viewed;
providing information, in response to a signal indicating that a user has completed viewing at least a portion of the requested video content, that presents the user with the option of viewing the requested video content in its entirety; and
generating a monetary charge based at least in part on viewing duration information.

18. The method of claim 17, wherein the information representing the plurality of available video content is sent periodically.

* * * * *